United States Patent [19]

Jüntgen et al.

[11] 4,124,529

[45] Nov. 7, 1978

[54] CARBONACEOUS ADSORBENTS AND PROCESS FOR MAKING SAME

[75] Inventors: Harald Jüntgen; Horst Schumacher; Jürgen Klein; Karl Knoblauch; Hans-Jürgen Schröter; Georg Kölling, all of Essen; Ingo Romey, Hünxe, all of Fed. Rep. of Germany

[73] Assignee: Bergwerksverband GmbH, Essen, Fed. Rep. of Germany

[21] Appl. No.: 801,384

[22] Filed: May 27, 1977

[30] Foreign Application Priority Data

Jun. 2, 1976 [DE] Fed. Rep. of Germany ....... 2624663

[51] Int. Cl.$^2$ .................. C01B 31/10; B01J 21/18; C01B 31/02
[52] U.S. Cl. .................................. 252/421; 252/444; 252/445; 264/29.1; 423/445
[58] Field of Search .................. 252/421, 444, 445; 423/445, 449; 264/29.1, 117; 201/6

[56] References Cited

U.S. PATENT DOCUMENTS

| | | | |
|---|---|---|---|
| 1,783,110 | 11/1930 | Defris | 252/421 |
| 3,859,421 | 6/1975 | Hucke | 423/449 |
| 3,888,958 | 6/1975 | Jungten et al. | 423/449 |
| 3,891,574 | 6/1975 | Kobayashi et al. | 252/421 |
| 3,915,906 | 10/1975 | Romey | 106/307 |

FOREIGN PATENT DOCUMENTS 1,398,466  6/1975  United Kingdom ............ 252/444

Primary Examiner—P. E. Konopka
Attorney, Agent, or Firm—Michael J. Striker

[57] ABSTRACT

A carbonaceous adsorbent in the form of a shaped body which has been heated to about 400 to 1400° C in an inert atmosphere is composed essentially of a mixture of finely divided carbonaceous material of a grain size below 50 and up to below 100 microns with a binder composed of about 1 to 20% by weight of a natural or synthetic elastomer and about 1 to 15% by weight of a thermoplastic material. The adsorbent is made by subjecting the mixture to a shaping step followed by heating to a temperature of about 400° to 1400° C in an inert atmosphere which step may be followed by an activation of the carbonaceous material.

11 Claims, No Drawings

CARBONACEOUS ADSORBENTS AND PROCESS FOR MAKING SAME

BACKGROUND OF THE INVENTION

The invention relates to a carbonaceous adsorbent which is composed of finely divided carbonaceous materials and binders and is made by a low temperature treatment of the bodies formed of such material and if desired activation at temperatures between 600° and 1000° C. by means of hydrogen and/or carbon dioxide.

When making carbonaceous adsorbents it is desirable to adjust the adsorption properties and the pore system of the adsorbents according to the contemplated use. Because of the many different problems which for instance arise in the purification of flue gases and sewage waters one tries to be in possession of as broad a spectrum of differentially effective absorbents as possible.

It is known to make pressure and abrasion resistant activated carbons from finely divided carbonaceous materials by shaping, low temperature heating and activation using as binder plastic systems consisting of a mixture of phenols and aldehydes and/or their condensation products (German published application 23 22 706). This application also discloses that pulverulent activated carbons can be formed with solutions of polymers followed by drying and a pyrolysis step in which the binding agent forms a cokelike residue.

It has also become known that activated carbons can be made exclusively from organic polymers by thermic comminution of synthetic plastics either in individual form or in mixture of several plastics (thesis by R. F. Müller, Institute of Technology, Zurich 1972 "Über die Herstellung von Aktivkohlen aus organischen Kunststoffen und die Charakterisierung poroser Stoffe"). Neither in these instances nor in other prior art processes for making activated carbons with pitch as binding agents has it been accomplished that the pore systems can be adjusted across the entire range of pore radii.

It is therefore an object of the invention to provide an adsorbent with adjustable adsorption properties and pore types which can be used for entirely different uses.

SUMMARY OF THE INVENTION

This problem is solved by a carbonaceous adsorbent in the form of a shaped body which has been heated to about 400° to 1400° C. in an inert atmosphere composed essentially of a mixture of finely divided carbonaceous material of a grain size below 50 such as from 1 to 45 microns and up to below 100 microns with a binder composed of about 1 to 20% by weight of a natural or synthetic elastomer and about 1 to 15% by weight of a thermoplastic material. The adsorbent is made by subjecting the mixture to a shaping step followed by heating to a temperature of about 400 to 1400° C. in an inert atmosphere which step may be followed by an activation of the carbonaceous material.

The invention also embraces the process of making the adsorbents by mixing a finely divided carbonaceous material of a grain size below 50 and up to below 100 microns with about 1 to 20% by weight of a natural or synthetic elastomer and about 1 to 15% by weight of a thermoplastic material, the elastomer and thermoplastic material constituting the binding agent and then subjecting the mixture to a shaping step followed by heating of the shaped body to a temperature between about 400° and 1400° C. in an inert atmosphere and an activation treatment.

DISCUSSION OF THE INVENTION AND PREFERRED EMBODIMENTS

It was surprising to find that adsorbents with different pore types and, compared with conventional activated carbons, improved adsorption properties could be made which would be useful for different applications depending entirely on the selection of the initial mixture, the grain size of the initial components and the specific manner of thermic treatment of the formed raw or untreated shaped bodies.

The fact that it is possible to widely vary the macropore type by suitable selection of the mixture and the grain sizes of the starting products has a bearing on the kinetics of the adsorption process which is particularly important in case of water purification systems.

Of interest are such macropore types which have pores only in a narrow range of pore radii. It is also desirable to have the possibility to make larger or smaller mean macropore radii depending on the final application of the adsorbent. This is feasable with the process of the invention contrary to conventional adsorbents where any variation of the macropore type is possible only in a very limited manner.

The preferred carbonaceous starting products are mineral coal, oxidized mineral coal, charcoal, peat coke or lignite low temperature coke.

The preferred binding agents are elastomeric plastics such as butadiene-acrylonitrile mixed polymerizate, butadiene-styrene mixed polymerizate and additionally thermoplastic materials such as polyvinyl alcohol, polypropylene, polyethylene and mixtures of these materials. The binding agents can be added to the carbonaceous starting products in solid (pulverulent) or liquid form or in the form of solutions.

By use of these combinations of binding agents it is possible to form the starting products among others to particularly thin shaped bodies having a diameter below 1 mm.

Small grain sizes are used in adsorption techniques, particularly in the aqueous phase where a steep breakthrough in the adsorber is desirable.

Particularly, cylindrical shaped bodies are useful for adsorption processes. For water purification, preferably shaped bodies are used of a diameter between about 0.3 to 3 mm, for gas separation processes the diameters preferably are between 2 and 8 mm, and for special processes of gas purification in which a large throughput is to be expected, for instance, in the area of the smoke gas desulfurization, diameters of between 6 and 10 mm are preferred.

Of great importance for the adsorption properties and the micropore types of the adsorbents of the invention is the kind of thermic treatment of the raw, that is, untreated shaped bodies. For instance, the shaped bodies should be heated to an inert atmosphere to temperatures between 400° and 1400° C. In the range between 400° and 600° C. the rate of temperature increase should be between about 0.5° and 10° C./min, and in the temperature range of about 500° to 1000° C. it should be between about 5° and 50° C./min. The heating can also be carried out in a manner that between the two temperature ranges mentioned a third range with a particularly low rate of temperature increase is interposed. The shaped bodies after the heating treatment may be maintained at the thermal temperature for about 5 to 45 min.

After the heat treatment an activation can be effected in conventional manner with steam or carbon dioxide or mixtures of these two at temperatures between 600 and 1000° C.

The following examples of the invention will illustrate the manner of making and the properties obtained and the broad spectrum of properties as compared to conventional products.

The conventional activated carbons used in these examples are products of the Bergwerksverband Company of Essen, West Germany, and comprised 75% by weight of ground mineral coal dust, and 25% pitch formed to cylindrical bodies of 1.6 × 2.0 mm which were then subjected to a heat treatment of 850° C. up to a burn loss of 60%. However, the activated carbon B of Example 2 was a grained material of 1-3 mm grain size. The carbon Example 3 was in form of bodies 3 × 3 mm which were steam activated at 900° centigrade. The carbon of Example 7 were bodies of 9 × 9 mm activated at 900° centigrade.

EXAMPLE 1

80 parts by weight of lignite were dried and then ground to a grain size below 50 microns. The particles were then mixed with 10 parts by weight of a butadieneacrylonitrile mixed polymerizate in latex form and 10 parts by weight of polypropylene in pulverulent form with a particle size below 50 microns. The mixture was then passed into an extruder where cylindrical bodies were formed of a diameter of 1 mm and a length of 1 mm.

The subsequent thermic treatment of the initial shaped bodies was effected in an inert atmosphere up to a temperature of 400° C. with a rate of temperature increase of about 3.5° C./min, and then between 400° and 500° C. with a rate of temperature increase of about 1.6° C. whereupon between 500° to 1000° C. a rate of temperature increase of about 8° C./min was employed. The finished adsorption coke had a mean macropore diameter of $2 \cdot 10^4$ angstrom units.

After activation with steam up to a burn loss of 60% this adsorbent can for instance be used for purification of the drain waters from coking plants or for purification of phenolic drain waters. The improved charge figures as compared with conventional activated carbon appear from the following Table I.

TABLE I

| Adsorbent | Charge (mg/l) in | |
|---|---|---|
| | phenol solution | drain water from coking plant |
| Adsorption coke of Example I | 210 | 150 |
| commercially available activated carbon | 180 | 130 |

EXAMPLE 2

85 parts by weight of oxidized mineral coal of a grain size below 60 microns were mixed with 10 parts by weight of an aqueous solution of butadiene-acrylonitrile mixed polymerizate and 5 parts by weight of polyethylene of a particle size below 60 microns to form a homogeneous mixture. The mixture was further processed in an extruder to obtain cylindrical bodies of 1 mm diameter and a length of about 1 to 2 mm. The untreated shaped bodies were then heated up to 400° C. at a rate of temperature increase of 1.5° C./min and then from 400° to 900° C. at a rate of temperature increase of 10° C./min in an inert atmosphere. This was followed by an activation with steam up to a burn loss of 60%. The final adsorption coke had a mean macropore diameter of $8 \cdot 10^3$ angstrom units.

This adsorption coke was likewise used for purification of sewage waters and resulted in the following charge figures compared with conventional activated carbon.

TABLE II

| Adsorbent | Charge (mg/l) in | |
|---|---|---|
| | phenol solution | drain water from coking plant |
| Adsorption coke of Example 2 | 250 | 180 |
| Commercially available activated carbon A | 180 | 130 |
| activated carbon B | 173 | 128 |

The following table shows the improvement of the kinetics of the adsorption process by shortening the necessary time expressed in minutes for 90% of the maximum charge.

TABLE III

| | Phenol solution (1 000 mg/l) charge | | coking plant drain water (1 000 mg TOC/l) charge | |
|---|---|---|---|---|
| Adsorbent | 200 mg phenol per g of adsorbent | 90% of the same charge | 200 mg TOC per g adsorbent | 90% of the same charge |
| Adsorbent coke of Example 2 | 48 | 78 | 60 | 82 |
| Activated carbon with pitch as binder | 60 | 90 | 90 | 150 |

EXAMPLE 3

80 parts by weight of oxidized mineral coal of a grain size below 100 micron were mixed with 10 parts by weight of an aqueous solution of butadiene-acrylonitrile mixed polymerizate and 10 parts by weight of polyethylene of a grain size below 60 micron at a temperature of 150° C. to obtain a homogeneous mixture. The mixture was then extruded to cylindrical bodies of a diameter of 3 mm and a length of 7 mm. The untreated bodies were thereafter heated up to 400° C. at a rate of temperature increase of about 10° C./min and between 400° and 900° C. at a rate of temperature increase of about 20° C./min in an inert atmosphere. This was followed by an activation at different burn losses as the following Table IV shows. The finished adsorption coke had a mean macropore diameter of $2 \cdot 10^2$ angstrom units. The mean micropore diameters were, depending on the burn loss, between about 6.2 and 6.8 angstrom units.

The table shows the different dynamic coefficients of adsorption for different gases and compares these figures with an activated carbon in which pitch is used as the binder. In the case of larger gas molecules such as xenon and krypton the superiority is obviously more pronounced than in case of smaller gas molecules such as carbon monoxide and nitrogen.

TABLE IV

| Adsorbent | Dynamic adsorption coefficients (cm³/g) | | | | |
|---|---|---|---|---|---|
| | Xe | Kr | CH₄ | CO | N₂ |
| Adsorption coke of Example 3 having | | | | | |
| 25% burn loss | 1310 | 55.6 | 50.8 | 18.5 | 13.8 |
| 40% burn loss | 1208 | 56.5 | 61.5 | 21.4 | 12.6 |
| Activated carbon with pitch binder | | | | | |
| 23% burn loss | 766 | 41.7 | 55.1 | 16.0 | 10.2 |
| 39% burn loss | 636 | 39.4 | 36.1 | 12.6 | 9.4 |

EXAMPLE 4

80 parts by weight of beech charcoal of a grain size below 60 microns were homogeneously mixed with 10 parts by weight of butadiene-styrene mixed polymerizate and 10 parts by weight of polyvinyl alcohol of a grain size below 60 microns. The mixture was then extruded to a diameter of 4 mm and a length of 6 mm.

The fresh bodies were then heated in an inert atmosphere to 600° C. at a rate of heat increase of 10° C./min and from 600° to 850° C. at a rate of 40° C./min. The coke was then kept at the final temperature for about 5 minutes.

The final adsorbent had a mean micropore diameter between 3 and 6.3 Angstrom units. It had a better performance than conventional products in the adsorption of medium size gas molecules, for instance, carbon monoxide, methane, krypton or xenon.

EXAMPLE 5

80 parts by weight of anthracite of a grain size below 100 microns were mixed with 10 parts by weight of a butadiene acrylonitrile mixed polymerizate and 10 parts by weight of polyethylene of a grain size below 60 micron and were extruded to cylindrical bodies of a diameter of 5 mm and a length of 5 mm.

The untreated shaped bodies were then heated up to 425° C. at a rate of heat increase of 7° C./min and from 425° to 900° C. at a rate of heat increase of 15° C./min in an inert atmosphere. The material was then left for about 45 min at the final temperature and was then activated at 950° C. up to a burn loss of 10% by means of steam. The final adsorbent had a mean micropore diameter between 3 and 4.8 angstrom units. It had better adsorption properties than conventional products for small size gas molecules such as helium, hydrogen or oxygen.

EXAMPLE 6

85 parts by weight of peat coke of a grain size below 100 microns were mixed with 5 parts by weight of a butadiene-acrylonitrile mixed polymerizate and 10 parts by weight of polypropylene of a grain size below 60 microns and were then extruded to cylindrical bodies of a diameter of 6 mm and a length of 8 mm. The otherwise untreated shaped bodies were then heated up to 425° C. at a rate of heat increase of 7° C./min and between 425° and 900° C. at a rate of heat increase of 10° C./min in an inert atmosphere. The bodies obtained were then left for about 45 minutes at this temperature and were thereafter activated with steam up to a burn loss of 50% at 850° C. The final absorption coke had a mean micropore diameter between 3 and 7.8 angstrom units.

This adsorption coke was particularly suited for the adsorption of large size gas molecules, for instance, of higher hydrocarbons and pollutions by large molecule materials, for instance in sewage waters.

EXAMPLE 7

80 parts by weight of an oxidized fat coal, 10 parts by weight of a butadiene-acrylonitrile mixed polymerizate and 10 parts by weight of polyethylene were extruded to cylindrical bodies of a length of about 9 mm and a diameter of about 9 mm. The bodies were then subjected to a low temperature treatment at 900° C. at a rate of heat increase of 3.5° C./min up to 400° C. and thereafter a rate of heat increase of 7° C./min.

These products were put to use in a continuous cycle operation of an adsorption and desorption installation for flue gas desulfurization at a gas throughput of 20 Nm³/h. The results were compared with the results obtained with an adsorbent in which pitch was used as the binder. The SO₂ inlet concentration was 1000 ppm and the flue gas temperature was 120° C.

The following table shows the SO₂ charges after the first, tenth and twentieth adsorption and desorption cycle. As appears the adsorbent of the invention in the beginning took up less SO₂, but during the continuous operation took up distinctly more SO₂ than a conventional adsorbent with pitch as binder.

TABLE V

| | | Charge (% SO₂) | |
|---|---|---|---|
| | | with binder of Ex. 7 | with pitch as binder |
| 1. | cycle | 2 | 4 |
| 10. | cycle | 7 | 6 |
| 20. | cycle | 11 | 8 |

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A carbonaceous adsorbent comprising a shaped coal body which has been heated in steps to about 400 to 1000° C. in an inert atmosphere, the said body being essentially composed of a mixture of a finely divided coal material of a grain size below 50 and up to below 100 microns with a binder composed of about 1 to 20% by weight of a natural or synthetic elastomer and about 1 to 15% by weight of a thermoplastic material other than said elastomer wherein the rate of temperature increase is about 0.5° to 10° C./min. in the temperature range between about 400° and 600° C. and is about 5° to 50° C./min. in the temperature range of about 500° to 1000° C.

2. The carbonaceous adsorbent of claim 1 in which the coal material is mineral coal, oxidized mineral coal, charcoal, peat coke or lignite low temperature coke.

3. The carbonaceous adsorbent of claim 1 in which the binding agent is a butadiene-acrylonitrile mixed polymerizate, butadiene-styrene mixed polymerizate and the thermoplastic material is polyvinyl alcohol, polypropylene, polyethylene or a mixture of these materials.

4. The carbonaceous adsorbent of claim 1 wherein the shaped bodies have a diameter of 0.3 to 3 mm for purposes of water purification, of 2 to 8 mm for purposes of gas separation and of 6 to 10 mm for flue gas desulfurization.

5. The carbonaceous adsorbent of claim 1 wherein the said mixture comprises 80 to 85 parts by weight of said coal material, 5 to 10 parts by weight of the elastomer and 5 to 10 parts by weight of the thermoplastic material.

6. The carbonaceous adsorbent of claim 1 wherein the shaped bodies are cylindrical bodies of a diameter below 1 mm.

7. A process for making the adsorbents of claim 1 comprising mixing said finely divided coal material of a grain size below 50 and up to below 100 microns with a binder composed of about 1 to 20% by weight of a natural or synthetic elastomer and about 1 to 15% by weight of a thermoplastic material, then subjecting the mixture to a shaping step followed by heating of the thus-obtained shaped bodies to a temperature of about 400° to 1000° C. in an inert atmosphere wherein the rate of temperature increase is about 0.5° to 10° C./min. in the temperature range between about 400° and 600° C. and is about 5° to 50° C./min. in the temperature range of about 500° to 1000° C.

8. The process of claim 7 wherein the binder is added to the said coal material in solid or liquid form or in form of a solution.

9. The process of claim 7 wherein the shaped bodies are left at the final temperature for a time between about 5 to 45 minutes.

10. The process of claim 1 which includes the additional step of activation of the material obtained by heating at 600° to 1000° C.

11. The process of claim 10 wherein the activation is effected by means of steam or carbon dioxide or a mixture of both.

* * * * *